(12) United States Patent
Yuan et al.

(10) Patent No.: US 12,382,193 B2
(45) Date of Patent: Aug. 5, 2025

(54) METHOD AND IMAGE-PROCESSING DEVICE FOR DETERMINING A LENS DISTORTION CORRECTION FOR AN INTERCHANGEABLE CAMERA LENS

(71) Applicant: Axis AB, Lund (SE)

(72) Inventors: Song Yuan, Lund (SE); Johan Förberg, Lund (SE)

(73) Assignee: AXIS AB, Lund (SE)

( * ) Notice: Subject to any disclaimer, the term of this patent is extended or adjusted under 35 U.S.C. 154(b) by 2 days.

(21) Appl. No.: 18/537,842

(22) Filed: Dec. 13, 2023

(65) Prior Publication Data

US 2024/0205558 A1 Jun. 20, 2024

(30) Foreign Application Priority Data

Dec. 20, 2022 (EP) .................................. 22215081

(51) Int. Cl.
*G06T 5/80* (2024.01)
*G06V 10/44* (2022.01)
*H04N 25/61* (2023.01)

(52) U.S. Cl.
CPC ............... *H04N 25/61* (2023.01); *G06T 5/80* (2024.01); *G06V 10/44* (2022.01)

(58) Field of Classification Search
CPC ........... H04N 25/61; G06V 10/44; G06T 5/80
See application file for complete search history.

(56) References Cited

U.S. PATENT DOCUMENTS

2020/0394769 A1* 12/2020 Chen .......................... G06T 7/70
2020/0410650 A1 12/2020 Yamazaki

OTHER PUBLICATIONS

Wu et al., "Keeping a Pan-Tilt-Zoom Camera Calibrated", IEEE Transactions on Pattern Analysis and Machine Intelligence, vol. 35, No. 8, Aug. 2013, pp. 1994-2007.
G.P. Stein, "Lens Distortion Calibration Using Point Correspondences", IEEE, Computer Vision and Pattern Recognition, Jun. 17-19, 1997, pp. 602-608.

* cited by examiner

*Primary Examiner* — Sam Bhattacharya
(74) *Attorney, Agent, or Firm* — XSENSUS LLP

(57) ABSTRACT

A method for determining a lens distortion correction comprising:
obtaining an indication of a first feature and a first corrected position of the first feature in a first corrected image frame, the first corrected position is based on a first lens distortion correction of a first uncorrected position of the first feature in a first uncorrected image frame captured by the camera when equipped with a first interchangeable lens;
detecting a change of lenses on the camera;
obtaining an indication of a second feature and a second uncorrected position of the second feature in a second uncorrected image frame captured by the camera when equipped with a second lens;
matching the first feature with the second feature; and
determining a second lens distortion correction for the second lens based on a mapping between the first corrected position and the second uncorrected position.

14 Claims, 12 Drawing Sheets

METHOD AND IMAGE-PROCESSING DEVICE FOR DETERMINING A LENS DISTORTION CORRECTION FOR AN INTERCHANGEABLE CAMERA LENS

CROSS-REFERENCE TO RELATED APPLICATION

This application claims priority to European Patent Application No. 22215081.5 filed on Dec. 20, 2022, the entire disclosure of which is incorporated by reference herein.

TECHNICAL FIELD

The embodiments herein relate to a method and an image-processing device for determining a lens distortion correction for a camera lens used by a camera adapted for interchangeable lenses. A corresponding computer program and a computer program carrier are also disclosed.

BACKGROUND

Surveillance of the public using imaging, in particular video imaging, is common in many areas around the world. Areas that may need monitoring are for example banks, stores, and other areas where security is needed, such as schools and government facilities. However, it is illegal to mount cameras in many places without having a license/permission. Other areas that may need monitoring are processing, manufacturing and logistics applications where video surveillance is primarily used to monitor processes.

All real lenses create some form of aberration or image defects as a result of limitations. Aberrations occur because simple paraxial theory is not a completely accurate model of the effect of an optical system on light, rather than due to flaws in the optical elements.

In optics, aberration is a property of optical systems, such as lenses, that causes light to be spread out over some region of space rather than focused to a point. Aberrations cause the image formed by a lens to be blurred or distorted, with the nature of the distortion depending on the type of aberration. Aberration can be defined as a departure of the performance of an optical system from the predictions of paraxial optics. In an imaging system, it occurs when light from one point of an object does not converge into (or does not diverge from) a single point after transmission through the system.

The most commonly encountered distortions are radially symmetric, or approximately so, arising from the symmetry of a photographic lens. These radial distortions may for example be classified as either barrel distortions or pincushion distortion or a mixture of both, sometimes referred to as moustache distortion or complex distortion. FIG. 1a schematically illustrates barrel and pincushion distortion of horizontal and vertical lines forming squares. Mathematically, barrel and pincushion distortion may be described as quadratic, meaning they increase as with a square of a distance from a centre.

An image-forming optical system with aberration will produce an image which is not sharp. Makers of optical instruments need to correct optical systems to compensate for aberration. A lens distortion correction algorithm may be implemented by warping a distorted input image into a rectified, undistorted output image. It may do so by performing an inverse transformation; e.g., for every pixel (u,v) in the rectified output image, calculate the corresponding coordinate (u˜,v˜) in the input image.

A camera which is equipped with a lens for which the camera knows the lens distortion correction algorithm may apply the known lens distortion correction algorithm to correct for the aberrations. This may for example be the case for a camera equipped with a default lens.

There are methods for calculating a correction function for a camera lens for a camera. One example is to capture an image of an object with known straight lines, such as a chessboard. As it is known that the lines in the chessboard are straight a distortion correction function of the distorted lines may be calculated with known methods. An alternative may be to direct the camera to a region in a scene with some known straight lines. By matching lines in one or more distorted images, e.g., with the chessboard, with straightened lines, in one or more corrected images, a distortion correction may be calculated.

However, some cameras are adapted for interchangeable lenses or even for interchangeable sensor heads including lenses. That is, the camera may be adapted to work with different lenses. In that scenario, the camera may have access to lens distortion correction algorithms to some of the lenses, but not all. This is a problem if the camera is equipped with a lens for which it doesn't have access to a correct lens distortion correction algorithm. Further problems may be that the camera may not know which lens is fitted to it and that the camera may not even be aware of that a lens has been exchanged. Thus, the camera may apply a lens distortion correction algorithm for another lens. For example, the camera may apply a lens distortion correction algorithm for the default lens although the camera is equipped with another lens.

SUMMARY

An object of embodiments herein may thus be to obviate some of the problems mentioned above, or at least reduce the impact of them. Specifically, an object of embodiments herein may be how to correct for distortion from a lens without a known lens distortion correction algorithm. In other words, an object of embodiments herein may be how to calculate a lens distortion correction algorithm for a lens. Specifically, an object of embodiments herein may be how to calculate a lens distortion correction algorithm for an interchangeable lens without the use of a known pattern.

According to an aspect, the object is achieved by a method, performed in an image-processing device for determining a lens distortion correction for an interchangeable camera lens used by a camera adapted for interchangeable lenses.

The method comprises obtaining an indication of a first feature and a first corrected position of the first feature in a first corrected image frame. The first corrected position is based on a first lens distortion correction of a first uncorrected position of the first feature in a first uncorrected image frame comprising the first feature and captured by the camera when equipped with a first interchangeable lens. The first uncorrected image frame captures a first scene.

The method further comprises detecting a change of lenses on the camera from the first lens to a second interchangeable lens.

The method further comprises obtaining an indication of a second feature, corresponding to the first feature, and a second uncorrected position of the second feature in a second uncorrected image frame captured by the camera when equipped with the second lens. The second uncorrected image frame captures a second scene which at least partly overlaps the first scene.

The method further comprises matching the first feature with the second feature.

The method further comprises determining a second lens distortion correction for the second lens based on a mapping between the first corrected position of the matched first feature and the second uncorrected position of the matched second feature.

In embodiments herein mapping between a first position in a first image frame and a second position in a second image frame means a translation between the first position and the second position, such as a translation from the first position to the second position. The translation may for example be accomplished with a function or a table relating the first position and the second position.

According to another aspect, the object is achieved by an image-processing device configured to perform the above method.

According to further aspects, the object is achieved by a computer program and a computer program carrier corresponding to the aspects above.

Embodiments herein make use of the known first lens distortion correction associated with the first lens in order to calculate the second lens distortion correction for the second lens. Embodiments herein matches the first feature with the second feature. Thus, the first lens distortion correction is used to calculate a "ground truth" to which the second feature in the second uncorrected image frame may be mapped.

Since the first lens distortion correction is used to calculate the "ground truth" there is no need to capture images of known patterns, specifically there is no need to capture images comprising lines which are known to be straight, such as in a chessboard pattern, or fiducial markers. This lowers the complexity of obtaining the second lens distortion correction for the second lens.

The determination of the second lens distortion correction is made live, i.e., it takes the current status of the second lens into consideration, rather than using a distortion correction calculated using a sample lens. Any scene comprising distinguishable features may be used. Any features may be used, as long as it is possible with a certain level of certainty to match a first feature captured with a first lens with the same feature captured with a second lens. No prior knowledge of the scene is needed and no special arrangements of the scene is needed.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Figure 1A:
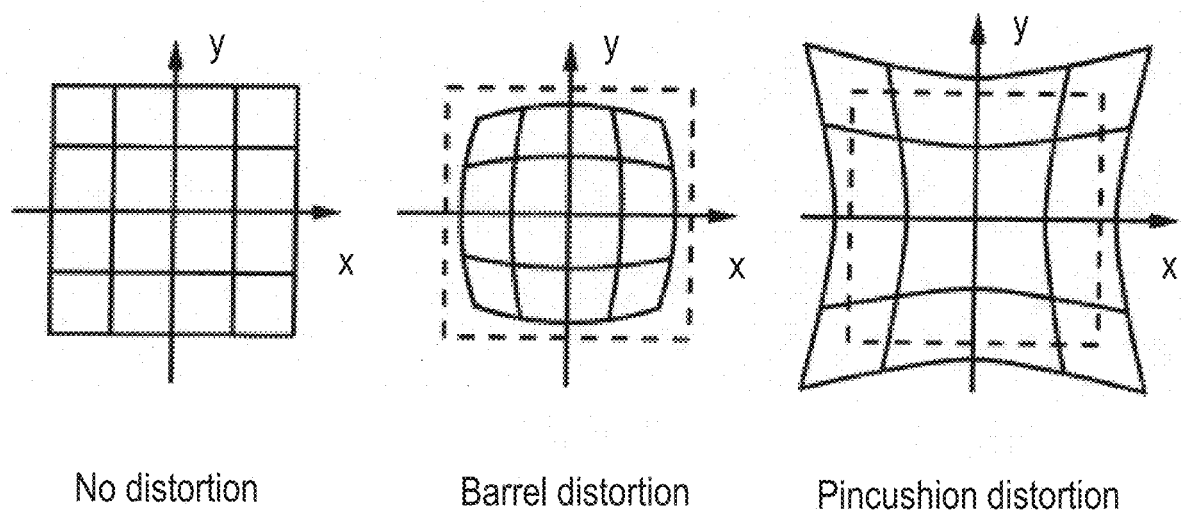
FIG. 1a schematically illustrates barrel and pincushion distortion.
Figure 1B:
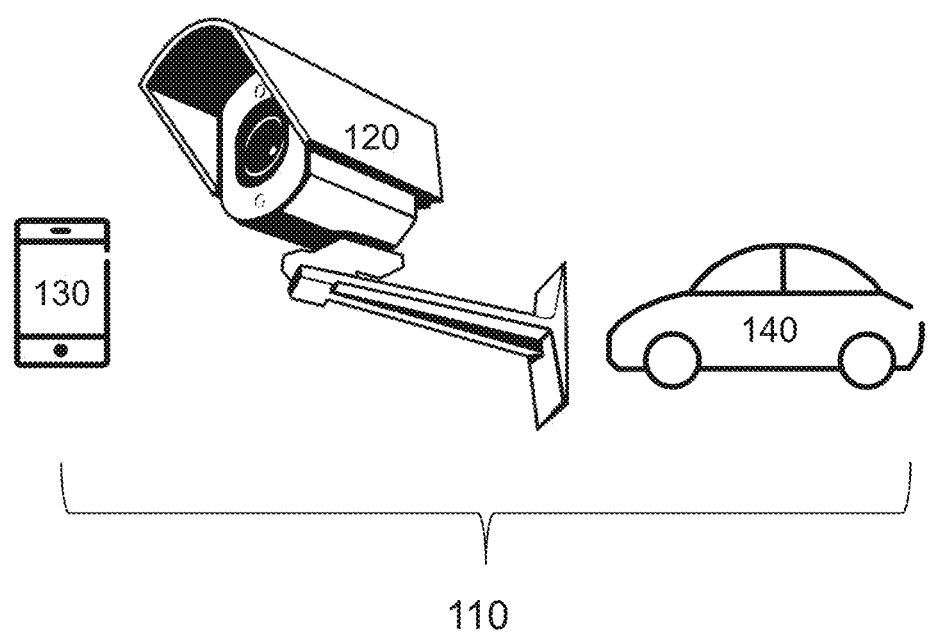
FIG. 1b illustrates exemplifying embodiments of image-capturing devices.

Embodiments herein may be implemented in one or more image-processing devices. In some embodiments herein the one or more image-processing devices may comprise or be one or more image-capturing devices such as a digital camera. FIG. 1b depicts various exemplifying image-capturing devices 110. The image-capturing device 110 may e.g., be or comprise any of a camcorder, a network video recorder, a camera, a video camera 120 such as a surveillance camera or a monitoring camera, a digital camera, a wireless communication device 130, such as a smartphone, including an image sensor, or a car 140 including an image sensor.

Figure 2A:
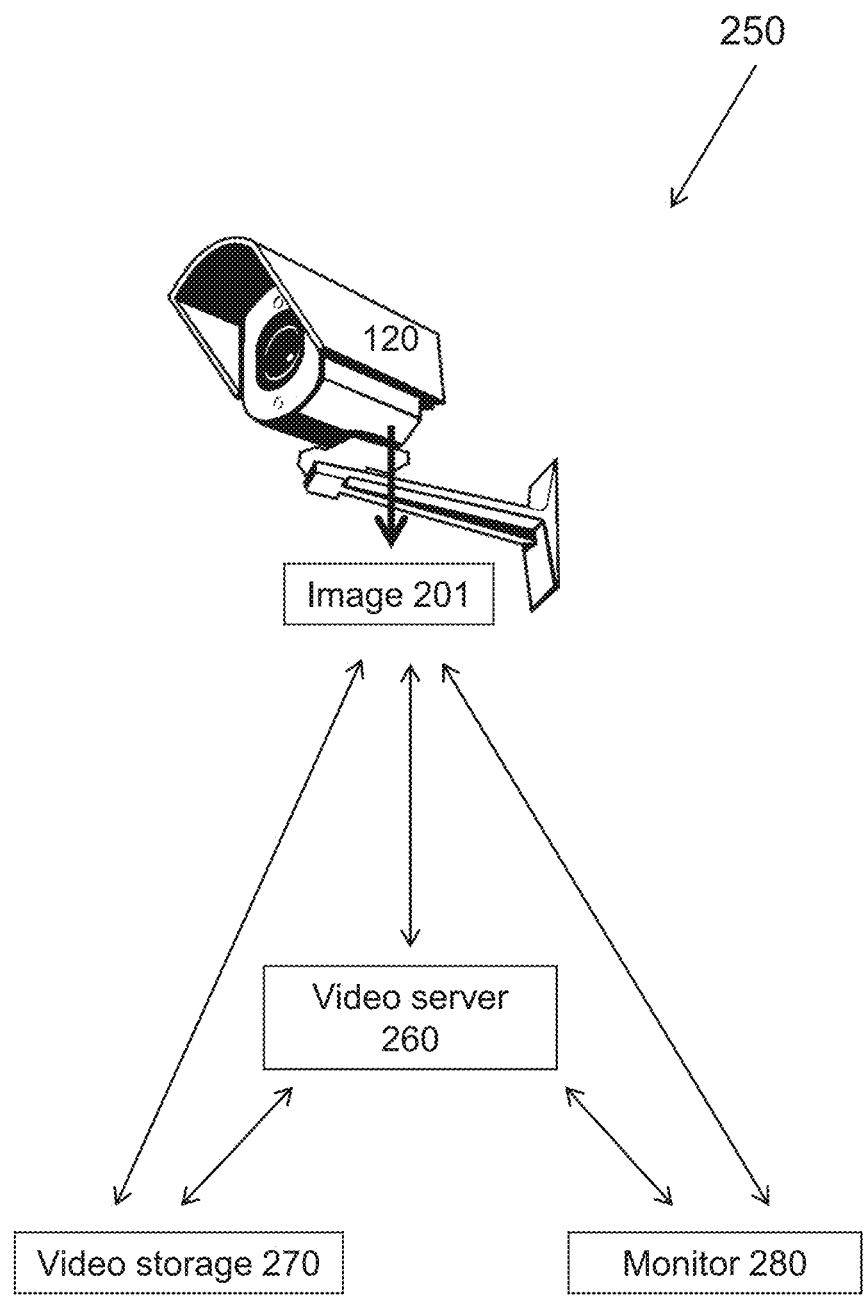
FIG. 2a illustrates exemplifying embodiments of a video network system.

FIG. 2a depicts an exemplifying video network system 250 in which embodiments herein may be implemented. The video network system 250 may include an image-capturing device, such as the video camera 120, which can capture and perform image processing on a digital image 201, such as a digital video image. A video server 260 in FIG. 2a may obtain the image, for example from the video camera 120 over a network or the like, which is indicated in FIG. 2a with the double-pointing arrows.

The video server 260 is a computer-based device that is dedicated to delivering video. Video servers are used in a number of applications, and often have additional functions and capabilities that address the needs of particular applications. For example, video servers used in security, surveillance and inspection applications typically are designed to capture video from one or more cameras and deliver the video via a computer network. In video production and broadcast applications, a video server may have the ability to record and play recorded video, and to deliver many video streams simultaneously. Today, many video server functions may be built-in in the video camera 120.

However, in FIG. 2a, the video server 260 is connected over the video network system 250, to the image-capturing device, here exemplified by the video camera 120. The video server 260 may further be connected to a video storage 270 for storage of video images, and/or connected to a monitor 280 for display of video images. In some embodiments the video camera 120 is connected directly with the video storage 270 and/or the monitor 280, as indicated by the direct arrows between these devices in FIG. 2a. In some other embodiments the video camera 120 is connected to the video storage 270 and/or the monitor 280 via the video server 260, as indicated by the arrows between the video server 260 and the other devices.

Figure 2B:
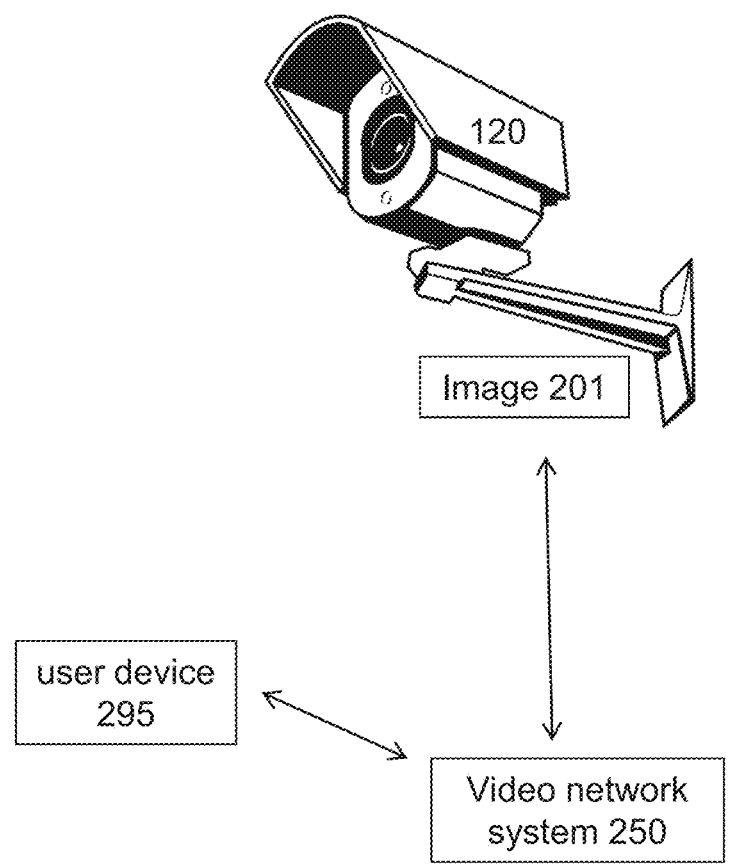
FIG. 2b illustrates exemplifying embodiments of a video network system and a user device.

FIG. 2b depicts a user device 295 connected to the video camera 120 via the video network system 250. The user device 295 may for example be a computer or a mobile phone. The user device 295 may e.g., control the video camera 120 and/or display video emanating from the video camera 120. The user device 295 may further include both the functionality of the monitor 280 and the video storage 270.

In order to better understand embodiments herein an imaging system will first be described.

Figure 3A:
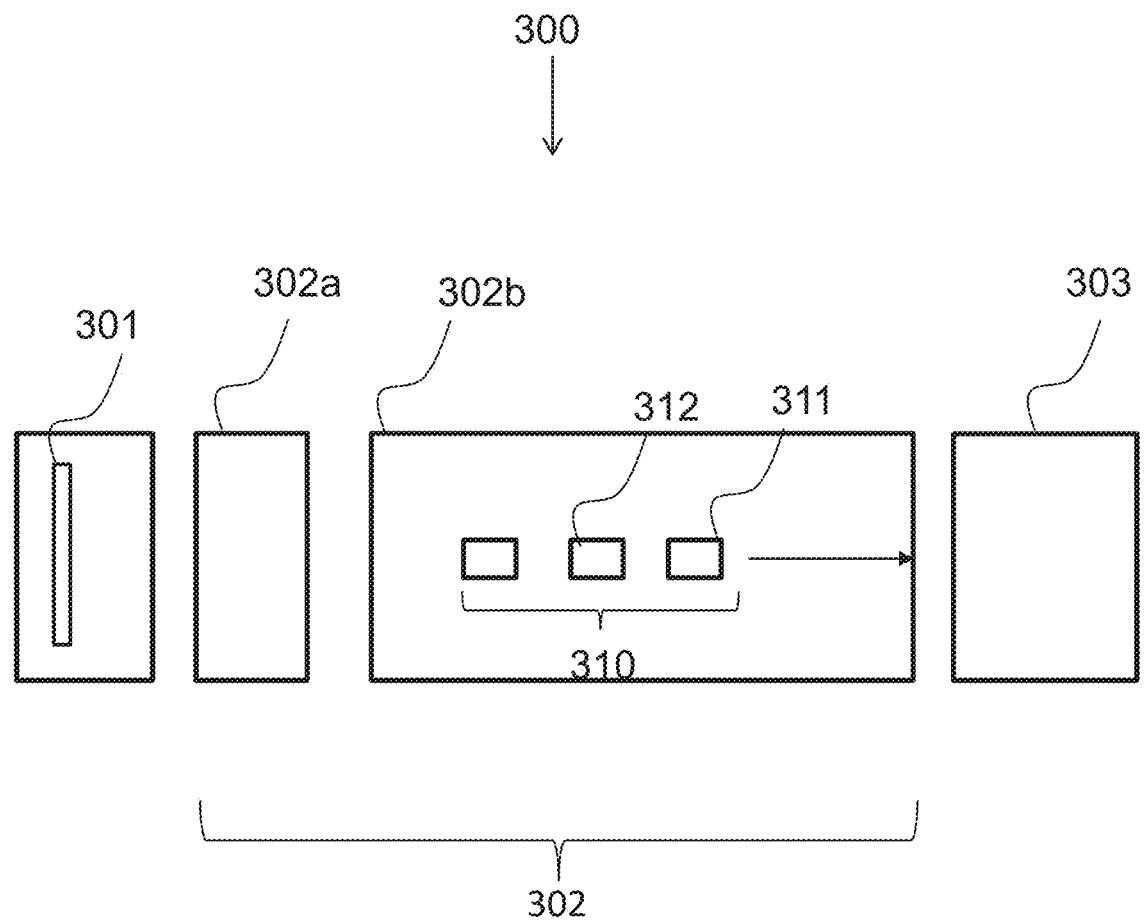
FIG. 3a is a schematic block diagram illustrating an exemplifying embodiment of an imaging system.

FIG. 3a is a schematic view of an imaging system 300, in this case of a digital video camera, such as the video camera 120. In general, the imaging system 300 may be part of the image-processing device in which embodiments herein are implemented. The imaging system 300 images a scene on an image sensor 301. The image sensor 301 may be provided with a Bayer filter, such that different pixels will receive radiation of a particular wavelength region, in a known pattern. Typically, each pixel of the captured image is represented by one or more values representing the intensity of the captured light within a certain wavelength band. These values are usually referred to as colour components, or colour channels. The term "image" may refer to an image frame or video frame including information originating from an image sensor that has captured the image.

After having read the signal of individual sensor pixels of the image sensors 301, different image processing actions may be performed by an image signal processor 302. The image signal processor 302 may comprise an image processing part 302a, sometimes referred to as an image processing pipeline, and a video post-processing part 302b.

Typically for video processing the images are comprised in a stream of images. FIG. 3a illustrates a first video stream 310 from the image sensor 301. The first image stream 310 may comprise multiple captured image frames, such as a first captured image frame 311 and a second captured image frame 312.

Image processing may comprise demosaicing, color correction, noise filtering (for eliminating spatial and/or temporal noise), distortion correction (for eliminating effects of, e.g., barrel distortion), global and/or local tone mapping (e.g., enabling imaging of scenes containing a wide range of intensities), transformation (e.g., rectification and rotation), flat-field correction (e.g., for removal of the effects of vignetting), application of overlays (e.g., privacy masks, explanatory text), etc. The image signal processor 302 may also be associated with an analytics engine performing object detection, recognition, alarms, etc.

The image processing part 302a may e.g. perform image stabilization, apply noise filtering, distortion correction, global and/or local tone mapping, transformation, and flat-field correction. The video post-processing part 302b may for example crop parts of an image, apply overlays, and comprise the analytics engine.

Following the image signal processor 302 the image may be forwarded to an encoder 303, wherein the information in the image frames is coded according to an encoding protocol, such as H.264. The encoded image frames are then forwarded to for example a receiving client, exemplified here with the monitor 280, to the video server 260, the storage 270, etc.

The video coding process produces a number of values that may be encoded to form a compressed bit stream. These values may include:
 quantized transform coefficients,
 information to enable the decoder to re-create a prediction,
 information about a structure of the compressed data and compression tools used during encoding, and
 information about the complete video sequence.

These values and parameters (syntax elements) are converted into binary codes using for example variable length coding and/or arithmetic coding. Each of these encoding methods produces an efficient, compact binary representation of the information, also referred to as an encoded bit stream. The encoded bit stream may then be stored and/or transmitted.

Figures 3B, 3C:
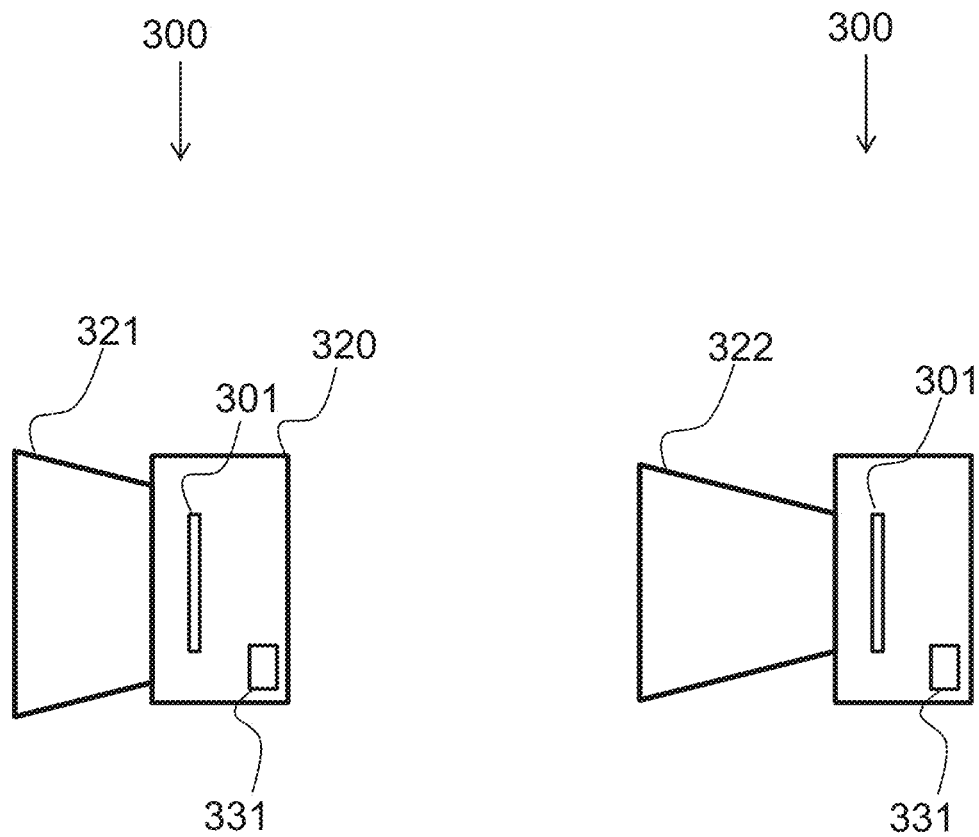
FIG. 3b is a schematic block diagram illustrating exemplifying embodiments of a sensor head including a lens.
FIG. 3c is a schematic block diagram illustrating exemplifying embodiments of a sensor head including a lens.

As mentioned above, some cameras may be adapted for interchangeable lenses. The different lenses may have different characteristics such as different focal lengths, e.g., to meet certain requirements of different use cases. FIG. 3b illustrates a schematic view of a sensor head 320 and a first interchangeable lens 321 of the imaging system 300. The sensor head 320 comprises the image sensor 301.

FIG. 3c illustrates a schematic view of the imaging system 300 when equipped with a second interchangeable lens 322.

Exemplifying embodiments for determining a lens distortion correction for an interchangeable camera lens used by a camera adapted for interchangeable lenses will now be described with reference to FIG. 4, FIG. 5a, FIG. 5b, FIG. 5c and FIG. 5d and with further reference to FIGS. 2a, 2b, 3a, 3b and 3c. The camera will be exemplified by the video camera 120 in FIGS. 1b, 2a and 2b. As mentioned above the camera 120 may have access to lens distortion correction algorithms to some of the lenses, but not all. This is a problem if the camera is equipped with a lens for which it doesn't have access to a correct lens distortion correction algorithm. For example, the camera 120 may have access to a first lens distortion correction algorithm for the first interchangeable lens 321, while the camera 120 may not have access to a second lens distortion correction algorithm for the second interchangeable lens 322.

The lens distortion correction may be a one-dimensional function. The lens distortion correction may be a function based on a distance to an optical centre. If the image sensor 301 and the lens 321, 322 are not perfectly aligned or if the lens has a strange shape then the lens distortion correction may be a two-dimensional function. The function may be described as a polynomial or in a tabulated form. In some embodiments herein, a first table may for example comprise uncorrected distances and corresponding corrected distances. For values between the tabulated values a linearization between the tabulated values may be used. In some other embodiments herein a second table may for example comprise scaling factors which represent a linear scaling between the uncorrected distances and the corresponding corrected distances.

Figure 4:
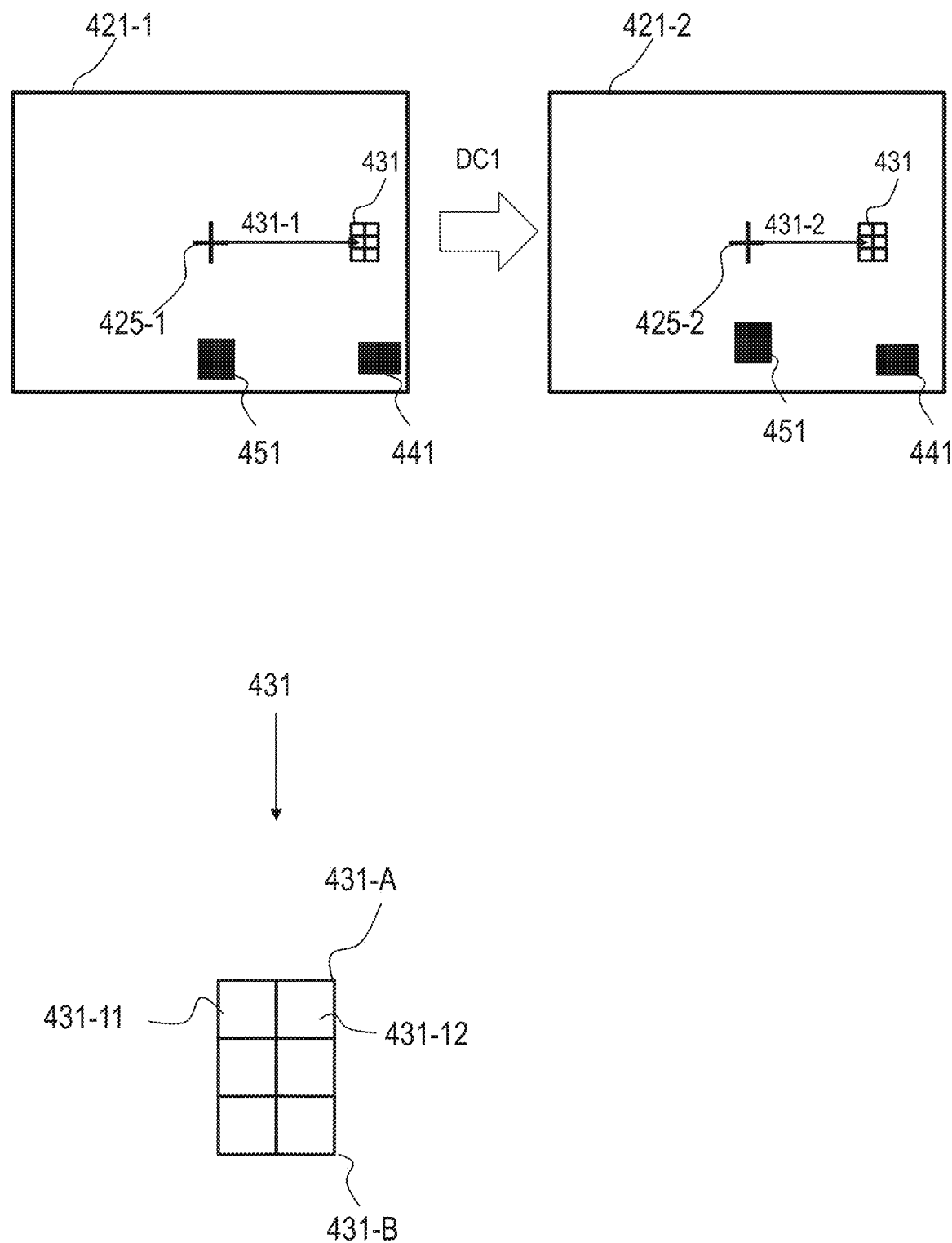
FIG. 4 is a schematic block diagram illustrating embodiments of a method in an image-processing device.

FIG. 4 illustrates a lens distortion correction for the first lens 321. Specifically, FIG. 4 illustrates a first uncorrected image frame 421-1 captured by the camera 120 with the first lens 321. The first uncorrected image frame 421-1 needs to be corrected due to the lens distortion associated with the first lens 321. The first uncorrected image frame 421-1 comprises a first feature 431 at a first uncorrected position 431-1. A feature is a piece of information which is relevant for solving a computational task related to a certain application. More specifically, in embodiments herein a feature may be part of an object, and its feature vector is a pattern that identifies it. A feature descriptor may comprise the feature vector and a position of the feature. The feature may for example be an edge, a structure, colour, colour change, light condition, or light change.

In embodiments herein the application is to find a lens distortion correction which corrects a distorted image by warping pixel data from uncorrected pixel positions to corrected pixel positions. The lens distortion correction may be found by matching features in uncorrected and corrected images.

Feature matching is the task of establishing correspondences between two features of the same scene/object. A common approach to feature matching comprises detecting a set of feature points each associated with feature descriptors from image data. Once the features or feature points and their descriptors have been extracted from for example two or more images, the next step may be to establish some preliminary feature matches between these images.

Features may be parts or patterns of an object in an image that help to identify it. For example—a square has 4 corners and 4 edges, they may be called features of the square, and they help to identify it's a square. Features include properties like corners, edges, regions of feature points, ridges, etc. Features may be specific structures in the image such as points, edges or objects. The features may be classified into two main categories: A) features that are in specific locations of the images, such as mountain peaks, building corners, doorways, or interestingly shaped patches of snow. These kinds of localized features are often called keypoint features (or even corners) and are often described by the appearance of patches of pixels surrounding the point location, and B) features that may be matched based on their orientation and local appearance (edge profiles) are called edges and they may also be good indicators of object boundaries and occlusion events in an image sequence.

Traditional Computer Vision techniques for feature detection and feature matching include: Harris Corner Detection, Shi-Tomasi Corner Detector, Scale-Invariant Feature Transform (SIFT), Speeded-Up Robust Features (SURF) and Features from Accelerated Segment Test (FAST).

Traditional feature extractors may, at least in some cases, be replaced by a convolutional neural network (CNN), since CNN's have a strong ability to extract complex features that express the image in much more detail, learn task specific features and are much more efficient.

Components of feature detection and matching include:
1) Detection: Identify a feature point;
2) Description: Local appearance around each feature point may be described in some way that is, at least ideally, invariant under changes in illumination, translation, scale, and in-plane rotation. A descriptor vector may be obtained for each feature point. The appearance may for example include luminance values for each pixel around the feature point.
3) Matching: Descriptors are compared across the images, to identify similar features. For two images a set of pairs (Xi, Yi)↔(Xi', Yi') may be obtained, where (Xi, Yi) is a feature in one image and (Xi', Yi') its matching feature in the other image.

A feature descriptor is an algorithm which takes an image and outputs feature descriptors. Feature descriptors encode interesting information into a series of numbers and act as a sort of numerical "fingerprint" that may be used to differentiate one feature from another. Ideally, this information is invariant under image transformation, such that it is possible to find the feature again even if the image is transformed in some way. After detecting the feature points a descriptor for every one of them may be computed. Descriptors may be categorized into two classes: a) local descriptor, and b) global descriptor. A local descriptor is a compact representation of a point's local neighborhood. Local descriptors try to resemble shape and appearance only in a local neighborhood around a point and thus are very suitable for representing it in terms of matching. A global descriptor describes the whole image.

Returning to FIG. 4 the first uncorrected position 431-1 may be described by coordinates in a coordinate system. In some embodiments herein the first uncorrected position 431-1 is described by a distance to a centre 425-1 of the first uncorrected image frame 421-1. The first uncorrected position 431-1 may further be described by a direction towards the centre 425-1. The first uncorrected image frame 421-1 may also comprise further features at further positions, such as further features 441, 451 of the first uncorrected image frame 421-1. The centre 425-1 may be an optical centre.

FIG. 4 also illustrates a first corrected image frame 421-2 computed from the first uncorrected image frame 421-1 by a first lens distortion correction. The first corrected image frame 421-1 also comprises the first feature 431 at a first corrected position 431-2. The first corrected position 431-2 differs from the first uncorrected position 431-1. The first corrected image frame 421-2 may also comprise the further features at further corrected positions.

FIG. 4 also illustrates a centre 425-2 of the first corrected image frame 421-2. FIG. 4 further illustrates how the first lens distortion correction moves the first feature 431 from the first uncorrected position 431-1 to the first corrected position 431-2. That is, the first uncorrected position 431-1 of the first feature is corrected to the first corrected position 431-2. The first lens distortion correction may also move the further features 441, 451. The correction may be made with respect to the centres 425-1, 425-2 of the first uncorrected and corrected image frames 421-1, 421-2.

For example, radial distortion, whilst primarily dominated by low-order radial components, may be corrected using Brown's distortion model. As mentioned above, the most commonly encountered distortions are radially symmetric. These radial distortions may for example be classified as either barrel distortions or pincushion distortion or a mixture of both. Mathematically, barrel and pincushion distortion may be described as quadratic, meaning they increase as the square of distance from the centre.

As mentioned above, a lens distortion correction algorithm may be implemented by warping a distorted input image into a rectified, undistorted output image. It may do so by performing an inverse transformation; e.g., for every pixel (u,v) in the rectified output image, calculate the corresponding coordinate (ŭ,v̆) in the input image.

The following calculations are based on a single feature, but may be extended to multiple features, which will be described below.

The positions of the features may be described by a radius to the centre of the respective image frame.

Let r(1, u) be a first uncorrected radius to a feature, such as the first feature 431, captured with the first lens 321.

Let r(1, c) be a first corrected radius to a feature, such as the first feature 431, (e.g., after the first uncorrected image frame 421-1 has been corrected) captured with the first lens 321.

A relation which finds r(1, u) from r(1, c) is known from a calibration, carried out during for example a lens or camera manufacturing.

For a single feature point, i.e., for a single pixel, this is: r(1, u)=p r(1, c), where p is a real positive number.

The relation works "backwards", from the corrected to the uncorrected image. A reason for this is that practically the corrected image is filled using pixel values from the uncorrected. Starting off with a "blank", corrected image and the model, answering the question: which pixels shall be picked from the uncorrected image and filled in this coordinate of the corrected image.

A best model may be the one that minimizes a sum:
$|r'(1, u)-r(1, u)|^2$ where r is the measured radiuses and r' those given by the model.

Which ends up in finding a p that minimizes: |r'(1, u)−r(1, u)|^2=|p r(1, c)−r(1, u)|^2.

In a situation with several positions of respective features or feature points, a goal may be to minimize a sum of all differences.

If for example the function used is a first degree polynomial:

$$r(1, u) = a + b * r(1, c)$$

A task here is to select a and b, which are same for all feature points, so that the sum of the differences/errors is as low as possible.

When writing as matrices, it may be seen as an equation:

$$AX \approx Y$$

Where the error |AX−Y| should be minimized.

Y are the measured real values, A describes the lens distortion correction, i.e., the model, and X values that should be optimized.

From the example from above, r(1, c)[0] is a radius of the 0:te feature and so on:

```
A = [
1, r(1, c)[0],
1, r(1, c)[1],
...
]
X = [
a,
b,
]
Y = [
r(1, u)[0],
r(1, u)[1],
...
]
```

Figure 5A:
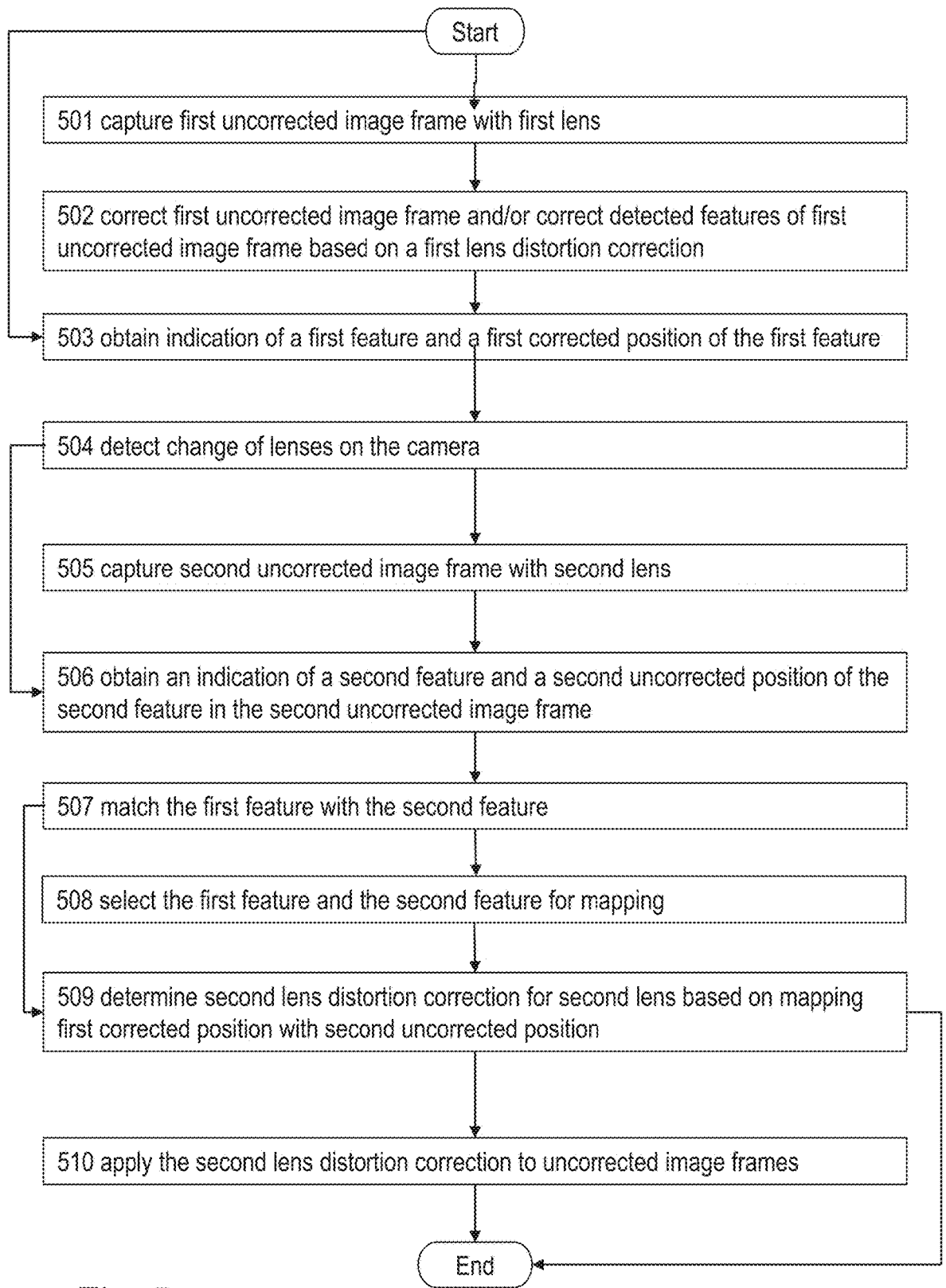
FIG. 5a is a flowchart illustrating embodiments of a method in an image-processing device.

FIG. 5a illustrates a flowchart describing a method performed in an image-processing device 120, 260, for determining a lens distortion correction for an interchangeable camera lens, such as the second interchangeable camera lens 322, used by the camera 120 adapted for interchangeable lenses 321, 322.

Further, the method may also be used for determining a correction for aberrations due to different alignments between the first lens 321 and the image sensor 301 and between the second lens 322 and the image sensor 301.

The image-processing device 120, 260 may e.g., be the video camera 120, such as a surveillance camera, or the video-server 260.

The below actions may be taken in any suitable order, e.g., in another order than the order presented below.

Action 501

The method may comprise capturing the first uncorrected image frame 421-1 with the first lens 321. The first uncorrected image frame 421-1 captures a first scene.

Action 502

The method may further comprise correcting the first uncorrected image frame 421-1 or correcting detected features, such as the first feature 431, of the first uncorrected image frame 421-1 or both based on the first lens distortion correction. Correcting the first feature 431 may comprise correcting the position of the first feature 431. For example, the first uncorrected position 431-1 may be corrected to the first corrected position 431-2. The first corrected position 431-2 is based on a first lens distortion correction of the first uncorrected position 431-1 of the first feature 431.

The entire first uncorrected image frame 421-1 need not be corrected for the proposed method. Instead, one or more feature descriptors comprising descriptions of the corrected features, including the corrected first feature 431, and their positions may be obtained and stored for embodiments herein.

Action 503

The method comprises obtaining an indication of the first feature 431 and the first corrected position 431-2 of the first feature 431 in the first corrected image frame 421-2. As mentioned above, the first corrected position 431-2 is based on a first lens distortion correction of the first uncorrected position 431-1 of the first feature 431.

The method may be applied to several features, such as the first feature 431 and a further first feature 441. In other words, the first feature 431 may comprise a set of multiple first features 431, 441.

Figure 5B:
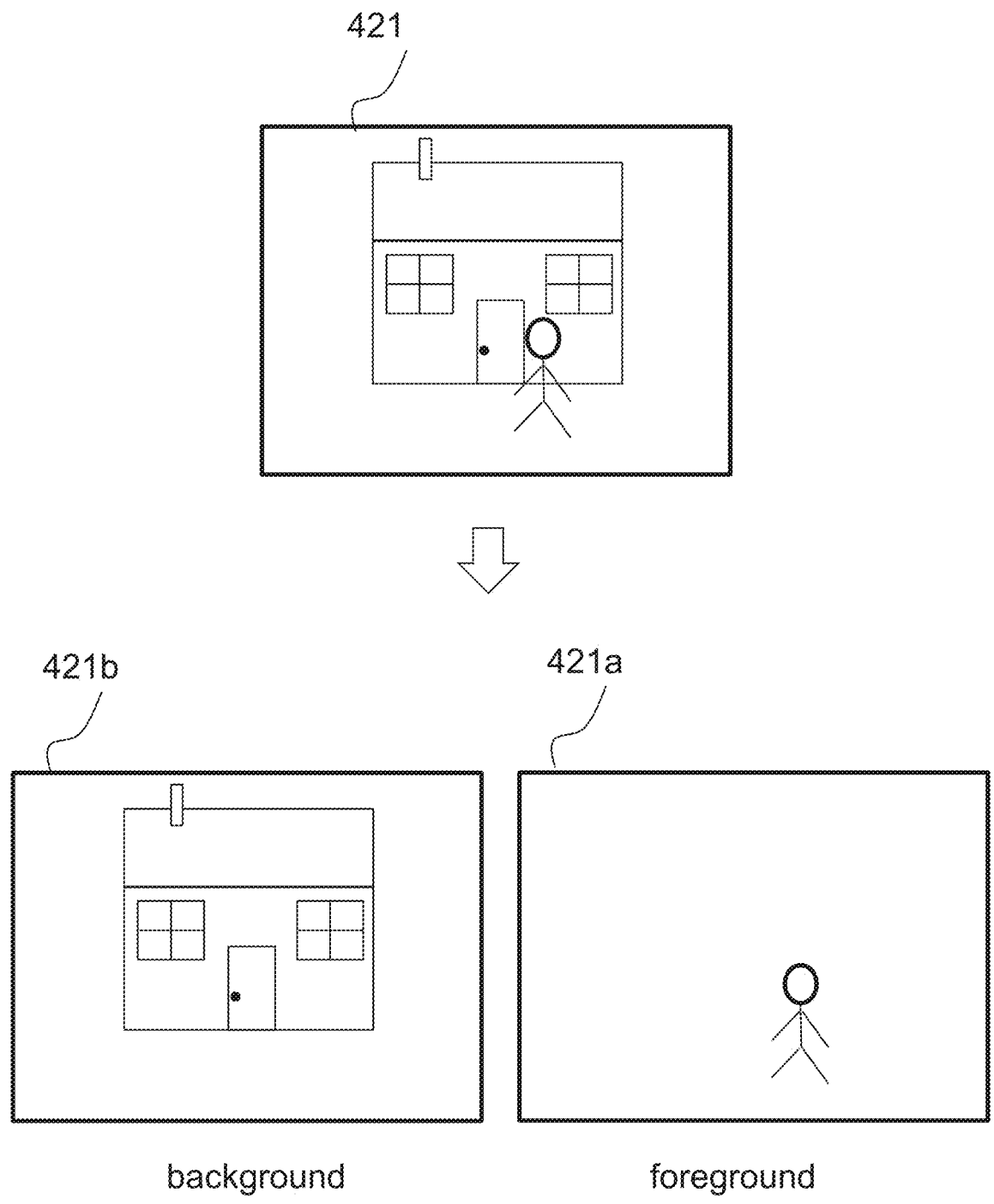
FIG. 5b is a schematic block diagram illustrating embodiments of a method in an image-processing device.

FIG. 5b illustrates some embodiments of obtaining the first feature 431 and thus the indication of the first feature 431. The first feature 431 may be obtained from a first background image frame 421b, e.g., based on the first corrected image frame 421-2 or based on the first uncorrected image frame 421-1. In detail, FIG. 5b illustrates a first image frame 421 taken with the first interchangeable lens 321. The first image frame 421 comprises a scene with different objects which may be classified as background objects and foreground objects according to some criteria. A first background image frame 421b may be generated and may comprise the background objects of the first image frame 421. Correspondingly, a first foreground image frame 421a may be generated and may comprise the foreground objects of the first image frame 421. Since the first feature 431 is obtained from the first background image frame 421b corrected positions of the first feature 431 in image frames captured by the camera 120 should not change due to a change of the lenses 321, 322. Therefore, the first corrected position 431-1 obtained from the first background image frame 421b is a good candidate to use as the ground truth.

FIG. 4 further illustrates a zoom-in of the first feature 431. In some embodiments herein the first feature 431 comprises multiple first pixels 431-11, 431-12 which are visible in the zoom-in part of FIG. 4.

The first feature 431 may further comprise multiple first feature points 431-A, 431-B at multiple first pixel locations, also visible in the zoom-in part of FIG. 4.

In some embodiments herein actions 502 and 503 are performed after action 504 or after actions 504 and 505. In some further embodiments herein actions 502 and 503 are even performed after action 506, e.g., after actions 504, 505 and 506. In some yet further embodiments action 503 comprises obtaining the first feature 431 from the first uncorrected image frame 421-1. Then action 502 may be performed before action 509, such as between action 507 and action 509.

Action 504

The method further comprises detecting a change of lenses on the camera 120 from the first lens 321 to the second interchangeable lens 322.

Detecting the change of lenses on the camera 120 from the first lens 321 to the second lens 322 may comprise any one or more of:

Comparing characteristics of a feature 431 from an image frame 421-1 captured by the camera 120 when equipped with the first lens 321 with characteristics of a feature 432 from an image frame 422-1 captured by the camera 120 when equipped with the second lens 322. For example, the lens change may be detected by comparing characteristics of the first feature 431 with characteristics of the second feature 432. In some example embodiments, the characteristics that are compared comprise feature vectors. In some further example embodiments, the characteristics that are compared comprise the position of the features. For example, a pixel location of a feature captured by the camera 120 when equipped with the first lens 321 may be compared with a pixel location of a feature captured by the camera 120 when equipped with the second lens 322 and the change of lenses 321, 322 may be detected based on detecting that these pixel locations differ. Further, the change of lenses 321, 322 may be detected based on a distance between these pixel locations. For example, if the distance between the pixel locations is above a threshold distance then the change of lenses may be detected. The comparison may be performed for multiple features. For example, if the distance between the pixel locations is larger than the threshold distance for a threshold number of features, then the change of lenses is detected.

Comparing a first background image captured by the camera 120 when equipped with the first lens 321 and a second background image captured by the camera 120 when equipped with the second lens 322. For example, a change of lenses may be detected by detecting a change of pixel positions of matched features. Features that are good candidates to use for detection of the change of lenses are for example features that are static as long as there is no change of lenses.

Detecting a cessation of a first signal from the first lens 321.

Detecting a second signal from a gyroscope 331, the second signal being associated with the change of lenses 321, 322.

Action 505

Figure 5C:
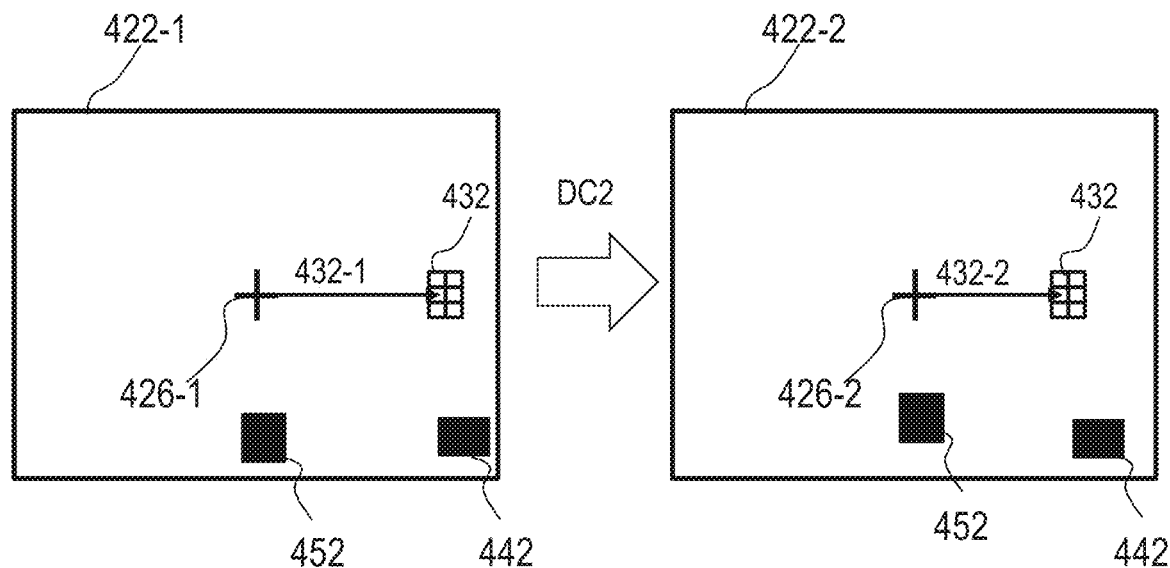
FIG. 5c is a schematic block diagram illustrating embodiments of a method in an image-processing device.
Figure 5C:
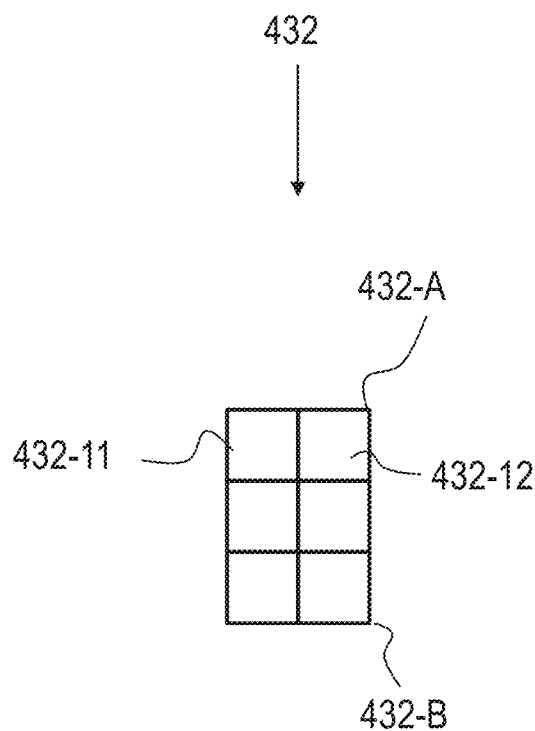

FIG. 5c corresponds to FIG. 4 and illustrates a lens distortion correction for the second lens 322 and corresponds to FIG. 4 illustrating the lens distortion correction for the first lens 321. Specifically, FIG. 5c illustrates a second uncorrected image frame 422-1 captured by the camera 120 with the second lens 322. The second uncorrected image frame 422-1 needs to be corrected due to the lens distortion associated with the second lens 322. The second uncorrected image frame 422-1 comprises a second feature 432 at a second uncorrected position 432-1. The second feature 432 may correspond to the first feature 431 captured with the first lens 321. The second feature 432 may be the same feature as the first feature 431. Since the second uncorrected image frame 422-1 is captured by the camera 120 with the second lens 322 the second uncorrected position 432-1 will most likely differ from the first uncorrected position 431-1. The first lens distortion correction will not be applicable for image frames captured with the second lens 322, such as the second uncorrected image frame 422-1 when uncorrected positions of corresponding features differ. Embodiments herein are directed to finding a second lens distortion correction that corrects the second uncorrected position 432-1 to the first corrected position 431-2.

The second uncorrected position 432-1 may be described by coordinates in a coordinate system. In some embodiments herein the second uncorrected position 432-1 is described by a distance to a centre 426-1 of the second uncorrected image frame 422-1. The second uncorrected image frame 422-1 may also comprise further features at further positions, such as further features 442, 452.

FIG. 5c also illustrates a second corrected image frame 422-2 computed from the second uncorrected image frame 422-1 by a second lens distortion correction. Embodiments herein disclose a method for calculating the second lens distortion correction. The second corrected image frame 422-1 also comprises the second feature 432 at a second corrected position 432-2. The second corrected image frame 422-2 may also comprise further features at further positions, such as the further features 442, 452. An aim of the second lens distortion correction may be to minimize a distance between the first corrected position 431-2, e.g., given by a pixel position, of the first feature 431 in the first corrected image frame 421-2, and the second corrected position 432-2, e.g., given by a pixel position, of the corresponding second feature 432 in the second corrected image frame 422-2.

The method may further comprise capturing the second uncorrected image frame 422-1 with the second lens 322.

The method is applicable also when a first Field of View, FOV, of the first uncorrected image frame 421-1 differs from a second FOV of the second uncorrected image frame 422-1 or wherein there is a global offset between the first uncorrected image frame 421-1 and the second uncorrected image frame 422-1 or both. The FOV may be obtained from the sensor size and the focal length f. For example, the FOV may be calculated as 2 times arctan(sensor size/2f).

Action 506

Figure 5D:
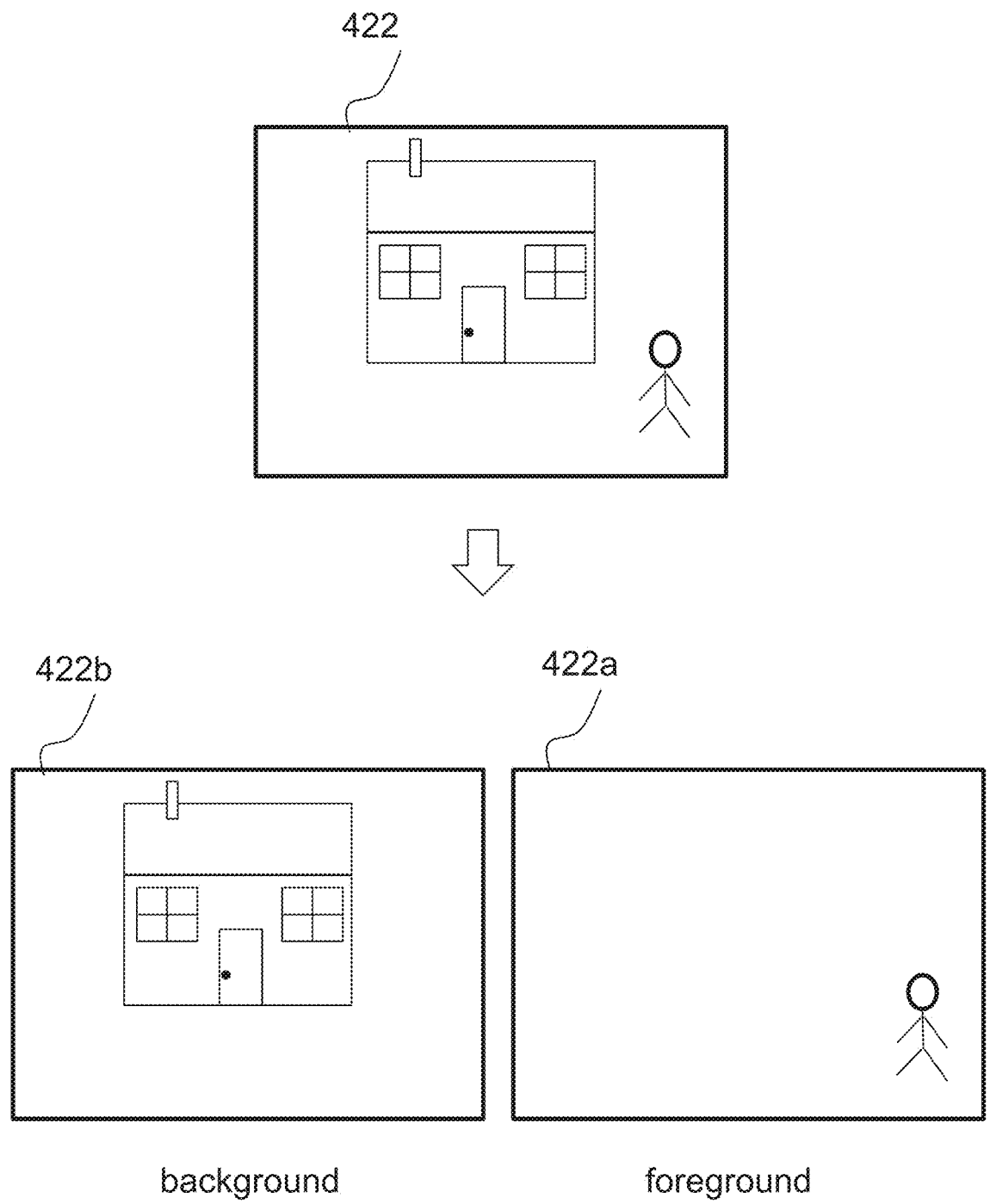
FIG. 5d is a schematic block diagram illustrating embodiments of a method in an image-processing device.

The method further comprises obtaining an indication of the second feature 432 corresponding to the first feature 431 and the second uncorrected position 432-1 of the second feature 432 in the second uncorrected image frame 422-1 captured by the camera 120 when equipped with the second lens 322. The second uncorrected image frame 422-1 captures a second scene which at least partly overlaps the first scene. FIG. 5d corresponds to FIG. 5b illustrating obtaining the first feature 431 from the background image frame 421b. FIG. 5d illustrates some embodiments of obtaining the second feature 432 and thus the indication of the second feature 432. The second feature 432 may be obtained from a second background image frame 422b based on the second uncorrected image frame 422-1. In detail, FIG. 5d illustrates a second image frame 422 taken with the second interchangeable lens 322. The second image frame 422 comprises a scene with different objects which may be classified as background objects and foreground objects according to some criteria. A second background image frame 422b may be generated and may comprise the background objects of the second image frame 422. Correspondingly, a second foreground image frame 422a may be generated and may comprise the foreground objects of the second image frame 422.

FIG. 5c further illustrates a zoom-in of the second feature 432. In some embodiments herein the second feature 432 comprises multiple second pixels 432-11, 432-12.

The second feature 432 may comprise multiple second feature points 432-A, 432-B at multiple second pixel locations. The multiple second pixel locations may correspond to the multiple first pixel locations.

The method may be applied to several features, such as the second feature 432 and a further second feature 442. In other words, the second feature 432 may comprise a set of multiple second features 432, 442.

Action 507

The method further comprises matching the first feature 431 with the second feature 432. For the matching, the first feature 431 may be derived from the first uncorrected image frame 421-1 or from the first corrected image frame 421-2. Thus, in some embodiments the image-processing device 120, 260 matches the first feature 431 in the first corrected image frame 421-2 with the second feature 432 in the second uncorrected image frame 422-1. In some other embodiments the image-processing device 120, 260 matches the first feature 431 in the first uncorrected image frame 421-1 with the second feature 432 in the second uncorrected image frame 422-1.

Matching may comprise comparing descriptors of features across the images, to identify similar features. For example, matching the first feature 431 with the second feature 432 may comprise comparing a first descriptor of the first feature 431 with a second descriptor of the second feature 432. For example, a first feature vector of the first feature 431 may be compared with a second feature vector of the second feature 432. The comparison may result in a numerical result which may be evaluated against a matching threshold value. For example, if a measure of matching the first feature 431 with the second feature 432 is larger than the matching threshold value then the first feature 431 matches the second feature 432. The matching may be based on a search distance algorithm, such as least square difference.

For example, a feature descriptor a=[a1, a2, ... ] may be a mathematical vector which may be compared with a corresponding feature descriptor b=b1, b2 ... ] using a vector norm such as $$|a-b| = sqrt((a1-b1)^2 + (a2-b2)^2$$

The feature matching may be used to either find or derive and transfer attributes from a source to a target image. Feature attributes analysis on the image may help determine the right match while feature matching. When one or more match fields are specified through an algorithm or model, spatially matched features may be checked against the match fields. If one source feature spatially matches two or more candidate target features, but one of the target features has matching attribute values, and the other doesn't, then the detected match may be chosen as the final match. Some examples of feature matching methods were mentioned above. Another example of an image feature matching method is Local Feature TRansformer.

When the features comprise multiple feature points then matching the first feature 431 with the second feature 432 may comprise matching each of the multiple first feature points 431-A, 431-B with a corresponding feature point of the multiple second feature points 432-A, 432-B.

Action 508

In some embodiments herein the method further comprises selecting the first feature 431 from a first set of features 431, 441, 451, e.g., in the first corrected image frame 421-2, and selecting the corresponding second feature 432 from a second set of features 432, 442, 452, e.g., in the second uncorrected image frame 422-1, based on how well the first feature 431 matches with the second feature 432. Thus, the selected features may be selected from matched features. How well the first feature 431 matches with the second feature 432 may for example be evaluated based on the measure of the match as described above in action 507. Such a measure may for example be a value between 0 and 1, where 0 indicates no match and 1 indicates a perfect match. A least square difference of the feature vectors may also be used.

The method may be performed for further features. For example, the method may be performed for the set of multiple first features 431, 441 and the set of multiple second features 432, 442.

Then selecting the set of multiple first features 431, 441 from the first set of features 431, 441, 451, and selecting the corresponding set of multiple second features 432, 442 from the second set of features 432, 442, 452 may further be based on a geographical representation of an overlap of the first and second scene by the selected set of multiple first features 431, 441 and set of multiple second features 432, 442. In some embodiments herein the respective set of multiple first and second features is selected such that it maximizes the geographical representation of the overlap.

The geographical representation may be determined in terms of a respective radial distance of the selected features from a geographical centre 425-1, 425-2, 426-1 of the image frame in which the features appear. The geographical centre 425-1, 425-2, 426-1 may be an optical centre. For example, the geographical representation may be determined in terms of a spread of the respective radial distance of the selected features from a geographical centre 425-1, 425-2, 426-1 of the image frame in which the features appear. In some embodiments herein the selected set of multiple first features 431, 441 and the selected set of multiple second features 432, 442 are each selected such that they maximize the spread of the radial distances of the selected features from the geographical centre 425-1, 425-2, 426-1.

For example, features that are selected from a larger set of features, such as all the features, may be selected based on their radial position, such that the ensemble of selected features cover different radial positions from a minimum to a maximum radial position of the overlap. Thus, the features may be selected based on how well they as an ensemble represent the possible radial positions of the overlap. In a first example there may be many features close to the centre of the overlap. Then the geographical coverage may be said to be poor. In a second example the features may be radially spread out over the overlap. Then the geographical coverage may be said to be good.

Thus, the features may be selected based on how well the selected features represent the overlap geographically. How well the selected features represent the overlap geographically may be measured by a spread of the radial distance to the centre 425-1, 425-2. The selecting may comprise computing a radial distance to the centre 425-1, 425-2 for a plurality of features, for example for all of the matching features, and then selecting an ensemble of features, e,g, comprising a fixed number of features, from the plurality of features which maximises a spread of a distribution of the positions of the selected features. For example, the spread of the radial distances of the selected set of multiple features may be calculated for multiple alternative selected sets and then compared. However, the number of features may also be dynamic, for instance depending on matching scores and/or how well the features are spread out radially from the centre of the image frame. As mentioned above, the centre of the image frame may be an optical centre. In some example embodiments the image-processing device 120, 260 selects further feature pairs, comprising a first feature and a second feature, with a high matching score, e.g., over a matching score threshold, and which positions are radially farthest away from already selected feature pairs. A position of a feature pair may be calculated as a mean position of the first feature and the second feature. In some embodiments herein the position of a first candidate feature pair is radially farthest away from already selected feature pairs when a respective difference between the radial distance to the centre of the image frame of the first candidate feature pair and the respective radial distance to the centre of the image frame of the already selected feature pairs is larger than a second respective difference between a second radial distance to the centre of the image frame of any other second candidate feature pair and the respective radial distance to the centre of the image frame of the already selected feature pairs.

If there are few selected feature pairs in an area of the overlap then the matching score threshold may be lowered. If there are many selected feature pairs in an area of the overlap then the matching score threshold may be increased.

Thus, selecting the set of multiple first features 431, 441 from the first set of features 431, 441, 451, and selecting the corresponding set of multiple second features 432, 442 from the second set of features 432, 442, 452 may be based on a spread of the respective radial distance of the selected set of multiple features.

In other words, selecting the set of multiple first features 431, 441 from the first set of features 431, 441, 451 may be based on a spread of the respective radial distance of the selected set of multiple first features 431, 441. Correspondingly, selecting the corresponding set of multiple second features 432, 442 from the second set of features 432, 442, 452 may be based on a spread of the respective radial distance of the selected set of multiple second features 432, 442.

Selection based on the radial position may be an advantage if the lens aberration varies with radial distance to the optical centre.

In some embodiments herein selecting the features for mapping may be performed before the matching of features described above in action 507. If action 507 is performed after action 508 then a further selection of the features may be based on matching criteria, such as a matching threshold value. For example, a feature pair such as the first feature 431 and the second feature 432 may be selected for the further processing described below based on the matching threshold value.

Action 509

The method further comprises determining a second lens distortion correction for the second lens 322 based on a mapping between the first corrected position 431-2 of the matched first feature 431 and the second uncorrected position 432-1 of the matched second feature 432. The mapping between the first corrected position 431-2 of the matched first feature 431 and the second uncorrected position 432-1 of the matched second feature 432 may be a mapping in either direction. For example, the mapping between the first corrected position 431-2 of the matched first feature 431 and the second uncorrected position 432-1 of the matched second feature 432 may be a mapping of the second uncorrected position 432-1 of the matched second feature 432 to the first corrected position 431-2 of the matched first feature 431.

As mentioned above in action 507, in some embodiments the image-processing device 120, 260 matches the first feature 431 in the first uncorrected image frame 421-1 with the second feature 432 in the second uncorrected image frame 422-1. Then determining the second lens distortion correction for the second lens 322 may be based on a mapping between the first uncorrected position 431-1 of the matched first feature 431 and the second uncorrected position 432-1 of the matched second feature 432 combined with the first lens distortion correction of the first uncorrected position 431-1 of the first feature 431 in the first uncorrected image frame 421-1. In the end this will also result in the above-mentioned mapping of the second uncorrected position 432-1 of the matched second feature 432 to the first corrected position 431-2 of the matched first feature 431 since, as mentioned above, the first lens distortion correction of the first uncorrected position 431-1 of the first feature 431 moves the first feature 431 from the first uncorrected position 431-1 to the first corrected position 431-2. That is, the first uncorrected position 431-1 of the first feature is corrected to the first corrected position 431-2.

Thus, the mapping between the first corrected position 431-2 of the matched first feature 431 and the second uncorrected position 432-1 of the matched second feature 432 may be obtained by the mapping between the first uncorrected position 431-1 of the matched first feature 431 and the second uncorrected position 432-1 of the matched second feature 432 combined with a mapping between the first corrected position 431-2 and the first uncorrected position 431-1 of the matched first feature 431.

Determining the mapping may be based on minimizing a distance between the first corrected position 431-2 of the matched first feature 431 and the second corrected position 432-2 of the matched second feature 432. The second corrected position 432-2 is calculated based on applying the second lens distortion correction to the second uncorrected position 432-1.

Minimizing the distance between the first corrected position 431-2 of the matched first feature 431 and the second corrected position 432-2 of the matched second feature 432 may be performed by using a least square method. For example, the positions of the features may be described by a radius to the centre of the respective image frame.

Let r(1, c) be a first corrected radius to a feature, such as the first feature 431, (e.g., after the first uncorrected image frame 421-1 has been corrected) for the first lens 321.

Let r(2, u) be an uncorrected radius to a same or corresponding feature, such as the second feature 432, captured with the second lens 322.

Let r(2, c) be a corrected radius to the same or corresponding feature, such as the second feature 432, (e.g., after the second uncorrected image 422-1 has been corrected), captured with the second lens 322.

A problem is then how to pick pixels from the second uncorrected image frame 422-1 captured with the second lens 322 and ensuring that it looks like the first corrected image frame 421-2 captured with the first lens 321. In other words, one may assume that r(1, c)=r(2, c), i.e. embodiments herein aim to obtain a same geometry with the second lens 322 as with the first lens 321. Practically, a constant factor may be added, corresponding to digitally zooming in or out a bit, which does not change the discussion. Such a constant factor may be needed for instance if the two lenses capture the scene with very different FoVs.

Then let r(2, u)=q r(1, c), where q is a scaling factor, i.e., a real positive number.

|r'(2, u)−r(2, u)|^2 where r is the measured radiuses and r' those given by a model, such as the second lens distortion correction.

The second lens distortion correction may be found by finding a q that minimizes:

$$|r'(1, c) - r(2, u)|^{\wedge}2 = |qr(1, c) - r(2, u)|^{\wedge}2.$$

In a first embodiment r(1, c) is obtained directly from the first corrected image frame 421-2 from the first feature 431, while r(2, u) is obtained by a direct measure in the second uncorrected image frame 422-1 of the second feature 432.

A second embodiment is similar, but here r(1, c) is instead obtained directly from the first uncorrected image frame 421-1 from the first feature 431, giving r(1, u). Then the calibration from manufacturing may be applied to the first uncorrected position 431-1 of the first feature 431 to obtain r(1, c). In this way no actual correction is needed of the first uncorrected image frame 421-1 captured with the first lens 321.

It is necessary to invert the first lens distortion correction, i.e., the calibrated model that gave r(1, u)←r(1, c). This is possible in most interesting cases.

If the corrections are described by parameters of a polynomial, then the mapping may comprise finding the parameters of the polynomial that minimises the distance between the first corrected position 431-2 of the matched first feature 431 and the second corrected position 432-2 of the matched second feature 432.

Embodiments herein may be performed for features comprising multiple pixels. Then the mapping may be performed for each pixel of the multiple first pixels 431-11, 431-12 and each corresponding pixel of the multiple second pixels 432-11, 432-12.

Embodiments herein, and specifically action 509, may be performed when the first feature 431 comprises the set of multiple first features 431, 441 and the second feature 432 comprises the corresponding set of multiple second features 432, 442. Then embodiments herein, and specifically action 509, may be performed for multiple pairs of first and second features 431, 432. Each feature of the set of multiple features may comprise multiple pixels and the mapping may be performed for a corresponding pair of pixels of each pair of corresponding features.

In some embodiments the second lens distortion correction is determined such that corrected image frames 422-2 captured by the camera 120 when equipped with the second lens 322 are affected by less lens distortion than uncorrected image frames 422-1 captured by the camera 120 when equipped with the second lens 322. For example, the second lens distortion correction may be determined such that the second corrected image frame 422-2 is affected by less lens distortion than the second uncorrected image frame 422-1.

Action 510

The method may further comprise applying the second lens distortion correction to uncorrected image frames 422-1 captured by the camera 120 when equipped with the second lens 322.

FIG. 5c also illustrates a centre 426-2 of the second corrected image frame 422-2. FIG. 5c further illustrates how the second lens distortion correction moves the second feature 432 from the second uncorrected position 432-1 to the second corrected position 432-2. That is, the second uncorrected position 432-1 of the second feature is corrected to the second corrected position 432-2. The second lens distortion correction may also move the further features 442, 452. The correction may be made with respect to the centres 426-1, 426-2 of the second uncorrected and corrected image frames 422-1, 422-2.

As mentioned above, the first feature 431 may be obtained from the first background image 421b based on the first corrected image frame 421-2 and the second feature 432 may be obtained from the second background image 422b based on the second uncorrected image frame 422-1.

In some embodiments herein the first feature 431 comprises multiple first pixels 431-11, 431-12 and the second feature 432 comprises multiple second pixels 432-11, 432-12.

The first feature 431 may comprise multiple first feature points 431-A, 431-B at multiple first pixel locations and the second feature 432 may comprise multiple second feature points 432-A, 432-B at multiple second pixel locations. The multiple second pixel locations may correspond to the multiple first pixel locations.

In embodiments herein it is an advantage that it is not necessary that the first and second features 431, 432 are associated with a straight line, nor a known fiducial marker. Since it is not necessary that the first and second features 431, 432 are associated with a straight line, nor a known fiducial marker the requirements for performing the method are more relaxed compared to other methods.

Thus, in some embodiments herein the first and second features 431, 432 are not associated with a straight line, nor a known fiducial marker.

Figure 6:
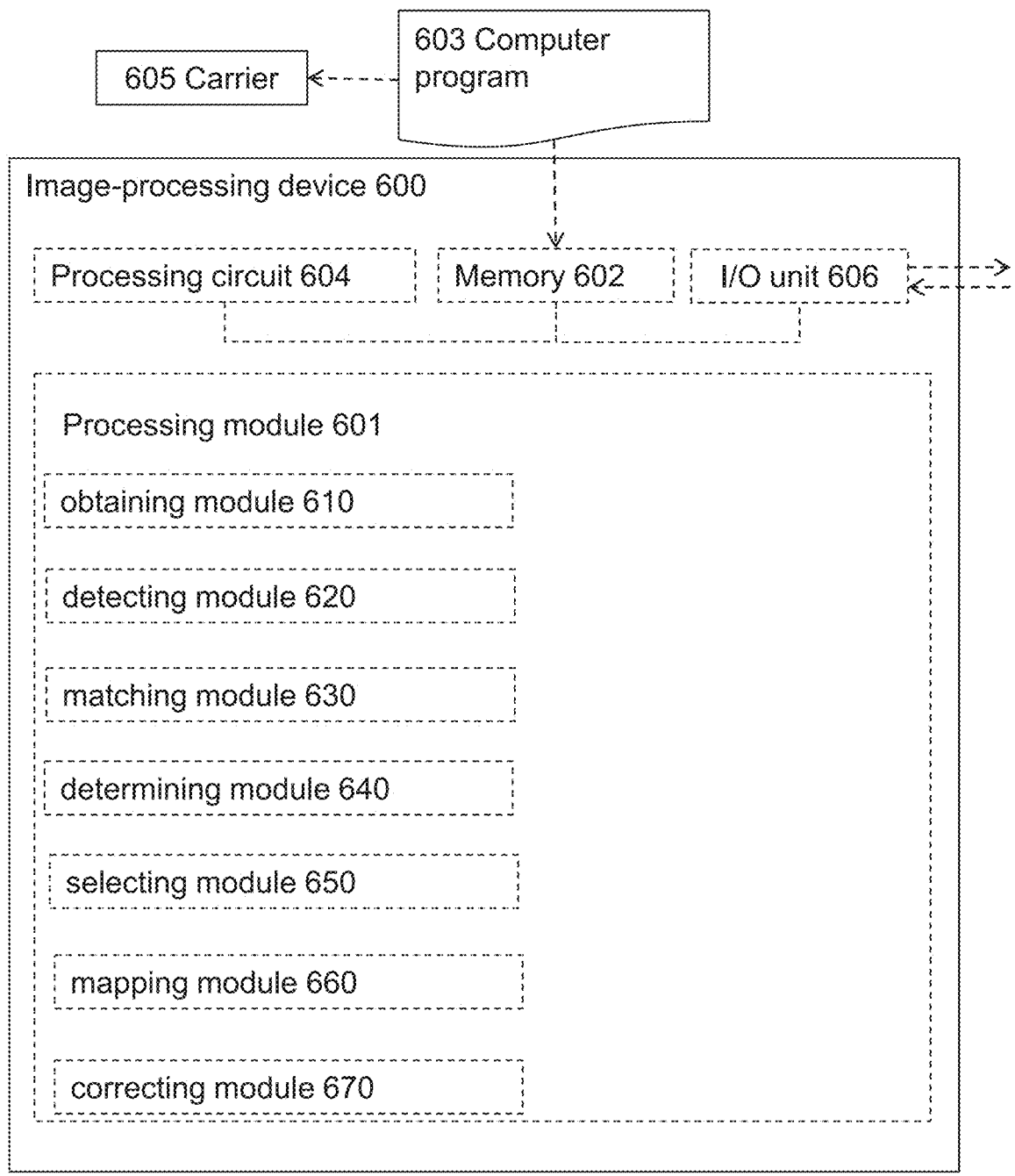
FIG. 6 is a block diagram illustrating embodiments of the image-processing device.

With reference to FIG. 6, a schematic block diagram of embodiments of an image-processing device 600 is shown. The image-processing device 600 corresponds to the image-processing device 110 of FIG. 1b. Thus, the image-processing device 600 may comprise or be any of a camera, such as a surveillance camera, a monitoring camera, a camcorder, a network video recorder, and the wireless communication device 130. In particular, the image-processing device 600 may be the camera 120, such as a surveillance video camera, or the video-server 260.

As mentioned above, the image-processing device 600 is configured for determining the lens distortion correction for the interchangeable camera lens, such as the second interchangeable camera lens 322, used by the camera 120 adapted for interchangeable lenses 321, 322.

The image-processing device 600 may further comprise a processing module 601, such as a means for performing the methods described herein. The means may be embodied in the form of one or more hardware modules and/or one or more software modules.

The image-processing device 600 may further comprise a memory 602. The memory may comprise, such as contain or store, instructions, e.g. in the form of a computer program 603, which may comprise computer readable code units which when executed on the image-processing device 600 causes the image-processing device 600 to perform the method of determining the lens distortion correction for the interchangeable camera lens.

The image-processing device 600 may comprise a computer and then the computer readable code units may be executed on the computer and cause the computer to perform the method of determining the probability value indicating that the object captured in the stream of image frames belongs to the object type.

According to some embodiments herein, the image-processing device 600 and/or the processing module 601 comprises a processing circuit 604 as an exemplifying hardware module, which may comprise one or more processors. Accordingly, the processing module 601 may be embodied in the form of, or 'realized by', the processing circuit 604. The instructions may be executable by the processing circuit 604, whereby the image-processing device 600 is operative to perform the methods of FIG. 5a as described above. As another example, the instructions, when executed by the image-processing device 600 and/or the processing circuit 604, may cause the image-processing device 600 to perform the methods according to FIG. 5a.

In view of the above, in one example, there is provided an image-processing device 600 for determining the lens distortion correction for the interchangeable camera lens.

Again, the memory 602 contains the instructions executable by said processing circuit 604 whereby the image-processing device 600 is operative for performing the method according to FIG. 5a.

FIG. 6 further illustrates a carrier 605, or program carrier, which comprises the computer program 603 as described directly above. The carrier 605 may be one of an electronic signal, an optical signal, a radio signal and a computer readable medium.

In some embodiments, the image-processing device 600 and/or the processing module 601 may comprise one or more of an obtaining module 610, a detecting module 620, a matching module 630, a selecting module 640, a mapping module 650 and a correcting module 660, as exemplifying hardware modules. In other examples, one or more of the aforementioned exemplifying hardware modules may be implemented as one or more software modules.

Moreover, the processing module 601 may comprise an Input/Output unit 606. According to an embodiment, the Input/Output unit 606 may comprise an image sensor configured for capturing the raw image frames described above such as the raw image frames comprised in the video stream 310 from the image sensor 301.

According to the various embodiments described above, the image-processing device 600 and/or the processing module 601 and/or the obtaining module 610 is configured to obtain an indication of a first feature 431 and a first corrected position 431-2 of the first feature 431 in a first corrected image frame 421-2, the first corrected position 431-2 is based on a first lens distortion correction of a first uncorrected position 431-1 of the first feature 431 in a first uncorrected image frame 421-1 comprising the first feature 431 and captured by the camera 120 when equipped with a first interchangeable lens 321, the first uncorrected image frame 421-1 capturing a first scene.

The image-processing device 600 and/or the processing module 601 and/or the obtaining module 610 is further configured to obtain an indication of a second feature 432, corresponding to the first feature 431, and a second uncorrected position 432-1 of the second feature 432 in a second uncorrected image frame 422-1 captured by the camera 120 when equipped with the second lens 322, the second uncorrected image frame 422-1 capturing a second scene which at least partly overlaps the first scene.

In some embodiments herein the first feature 431 is obtained from the first background image frame 421b and the second feature 432 is obtained from the second background image frame 422b.

The image-processing device 600 and/or the processing module 601 and/or the detecting module 620 is configured to detect a change of lenses on the camera 120 from the first lens 321 to a second interchangeable lens 322.

The image-processing device 600 and/or the processing module 601 and/or the matching module 630 is further configured to match the first feature 431 with the second feature 432.

The image-processing device 600 and/or the processing module 601 and/or the determining module 640 is further configured to determine a second lens distortion correction for the second lens 322 based on a mapping between the first corrected position 431-2 of the matched first feature 431 and the second uncorrected position 432-1 of the matched second feature 432.

In some embodiments herein the image-processing device 600 and/or the processing module 601 and/or the determining module 640 is further configured to determine the second lens distortion correction such that corrected image frames 422-2 are affected by less lens distortion than uncorrected image frames 422-1 captured by the camera 120 when equipped with the second lens 322.

The image-processing device 600 and/or the processing module 601 and/or the correcting module 670 may be further configured to apply the second lens distortion correction to uncorrected image frames 422-1 captured by the camera 120 when equipped with the second lens 322.

In some embodiments herein the image-processing device 600 and/or the processing module 601 and/or the detecting module 620 is configured to detect the change of lenses on the camera 120 from the first lens 321 to the second lens 322 by being configured to any one or more of:

compare characteristics of a feature 431 from an image frame 421-1 captured by the camera 120 when equipped with the first lens 321 with characteristics of a feature 432 from an image frame 422-1 captured by the camera 120 when equipped with the second lens 322;

detect a cessation of a first signal from the first lens 321; and detect a second signal from a gyroscope 331, the second signal being associated with the change of lenses 321, 322.

The image-processing device 600 and/or the processing module 601 and/or the determining module 640 may further be configured to determine the mapping based on minimizing the distance between the first corrected position 431-2 and the second corrected position 432-2.

The image-processing device 600 and/or the processing module 601 and/or the determining module 640 may further be configured to calculate the second corrected position 432-2 based on applying the second lens distortion correction to the second uncorrected position 432-1.

The image-processing device 600 and/or the processing module 601 and/or the selecting module 650 may be further configured to select the first feature 431 from a first set of features 431, 441, 451 and select the corresponding second feature 432 from a second set of features 432, 442, 452 based on how well the first feature 431 matches with the second feature 432.

When the method is performed for multiple first features 431, 441 and multiple second features 432, 442, then the image-processing device 600 and/or the processing module 601 and/or the selecting module 650 may be further configured to select the multiple first features 431, 441 from the first set of features 431, 441, 451, and select the corresponding multiple second features 432, 442 from the second set of features 432, 442, 452 further based on the geographical representation of the overlap of the first and second scene by the selected multiple first features 431, 441 and multiple second features 432, 442 in terms of the radial distance of the selected features from the geographical centre 425-1, 425-2, 426-1, 426-2 of the image frame in which the features appear.

As used herein, the term "module" may refer to one or more functional modules, each of which may be implemented as one or more hardware modules and/or one or more software modules and/or a combined software/hardware module. In some examples, the module may represent a functional unit realized as software and/or hardware.

As used herein, the term "computer program carrier", "program carrier", or "carrier", may refer to one of an electronic signal, an optical signal, a radio signal, and a computer readable medium. In some examples, the computer program carrier may exclude transitory, propagating signals, such as the electronic, optical and/or radio signal. Thus, in these examples, the computer program carrier may be a non-transitory carrier, such as a non-transitory computer readable medium.

As used herein, the term "processing module" may include one or more hardware modules, one or more software modules or a combination thereof. Any such module, be it a hardware, software or a combined hardware-software module, may be a connecting means, providing means, configuring means, responding means, disabling means or the like as disclosed herein. As an example, the expression "means" may be a module corresponding to the modules listed above in conjunction with the figures.

As used herein, the term "software module" may refer to a software application, a Dynamic Link Library (DLL), a software component, a software object, an object according to Component Object Model (COM), a software component, a software function, a software engine, an executable binary software file or the like.

The terms "processing module" or "processing circuit" may herein encompass a processing unit, comprising e.g. one or more processors, an Application Specific integrated Circuit (ASIC), a Field-Programmable Gate Array (FPGA) or the like. The processing circuit or the like may comprise one or more processor kernels.

As used herein, the expression "configured to/for" may mean that a processing circuit is configured to, such as adapted to or operative to, by means of software configuration and/or hardware configuration, perform one or more of the actions described herein.

As used herein, the term "action" may refer to an action, a step, an operation, a response, a reaction, an activity or the like. It shall be noted that an action herein may be split into two or more sub-actions as applicable. Moreover, also as applicable, it shall be noted that two or more of the actions described herein may be merged into a single action.

As used herein, the term "memory" may refer to a hard disk, a magnetic storage medium, a portable computer diskette or disc, flash memory, Random Access Memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), Secure Digital (SD) card, etc. One or more of the aforementioned examples of computer readable medium may be provided as one or more computer program products.

As used herein, the term "computer readable code units" may be text of a computer program, parts of or an entire binary file representing a computer program in a compiled format or anything there between.

As used herein, the terms "number" and/or "value" may be any kind of number, such as binary, real, imaginary or rational number or the like. Moreover, "number" and/or "value" may be one or more characters, such as a letter or a string of letters. "Number" and/or "value" may also be represented by a string of bits, i.e. zeros and/or ones.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed in an image-processing device, for determining a lens distortion correction for an interchangeable camera lens used by a camera adapted for interchangeable lenses, the method comprising:
   obtaining an indication of a first feature and a first corrected position of the first feature in a first corrected image frame, the first corrected position is based on a first lens distortion correction of a first uncorrected position of the first feature in a first uncorrected image frame comprising the first feature and captured by the camera when equipped with a first interchangeable lens, the first uncorrected image frame capturing a first scene;
   detecting a change of lenses on the camera from the first lens to a second interchangeable lens;
   obtaining an indication of a second feature, corresponding to the first feature, and a second uncorrected position of the second feature in a second uncorrected image frame captured by the camera when equipped with the second lens, the second uncorrected image frame capturing a second scene which at least partly overlaps the first scene;
   matching the first feature with the second feature; and
   determining a second lens distortion correction for the second lens based on a mapping between the first corrected position of the matched first feature and the second uncorrected position of the matched second feature.

2. The method according to claim 1, wherein the mapping between the first corrected position of the matched first feature and the second uncorrected position of the matched second feature is based on minimizing a distance between the first corrected position and a second corrected position, which second corrected position is calculated based on applying the second lens distortion correction to the second uncorrected position.

3. The method according to claim 1, wherein the first feature is obtained from a first background image frame and the second feature is obtained from a second background image frame based on the second uncorrected image frame.

4. The method according to claim 1, wherein the first feature comprises multiple first pixels and wherein the second feature comprises multiple second pixels.

5. The method according to claim 1, wherein the first and second features are not determined to be a straight line, nor a known fiducial marker.

6. The method according to claim 1, further comprising: applying the second lens distortion correction to uncorrected image frames captured by the camera when equipped with the second lens.

7. The method according to claim 6, wherein the second lens distortion correction is determined such that corrected image frames are affected by less lens distortion than the uncorrected image frames captured by the camera when equipped with the second lens.

8. The method according to claim 1, wherein detecting the change of lenses on the camera from the first lens to the second lens comprises any one or more of:
   comparing characteristics of a feature from an image frame captured by the camera when equipped with the first lens with characteristics of a feature from an image frame captured by the camera when equipped with the second lens;

detecting a cessation of a first signal from the first lens; and detecting a second signal from a gyroscope, the second signal being associated with the change of lenses.

9. The method according to claim 1, further comprising: selecting the first feature from a first set of features, and selecting the corresponding second feature from a second set of features based on how well the first feature matches with the second feature.

10. The method according to claim 9, wherein the first feature comprises a set of multiple first features, the second feature comprises a corresponding set of multiple second features and wherein the method is performed for multiple pairs of first and second features.

11. The method according to claim 10, wherein selecting the set of multiple first features from the first set of features, and selecting the corresponding set of multiple second features from the second set of features is further based on a geographical representation of an overlap of the first and second scene by the selected set of multiple first features and set of multiple second features.

12. An image-processing device configured to perform the method according to claim 1.

13. The image-processing device according to claim 12, wherein the image-processing device is the camera, such as a surveillance video camera, or a video-server.

14. A non-transitory computer product containing instructions for causing an image-processing device to perform the method according to claim 1.

* * * * *